US009152679B2

(12) United States Patent
Karni et al.

(10) Patent No.: US 9,152,679 B2
(45) Date of Patent: Oct. 6, 2015

(54) DISPLAYING RECOMMENDED ENTITIES IN A RELEVANCE MAP

(71) Applicant: Hewlett-Packard Development Company, L.P., Houston, TX (US)

(72) Inventors: Zachi Karni, Givat Ella (IL); Lior Shapira, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 13/755,814

(22) Filed: Jan. 31, 2013

(65) Prior Publication Data

US 2014/0214803 A1 Jul. 31, 2014

(51) Int. Cl.
G06F 17/30 (2006.01)

(52) U.S. Cl.
CPC ................................ *G06F 17/30554* (2013.01)

(58) Field of Classification Search
CPC .......... G06F 17/3005; G06F 17/30112; G06F 17/30554; G06F 17/30696; G06F 17/30991
USPC .......... 707/705, 722, 724, 734; 715/243, 244, 715/705, 715
See application file for complete search history.

(56) References Cited

U.S. PATENT DOCUMENTS

| 2003/0201914 A1* | 10/2003 | Fujiwara et al. | 340/995.24 |
| 2008/0243815 A1* | 10/2008 | Chan et al. | 707/5 |
| 2011/0078101 A1 | 3/2011 | Gotz et al. | |
| 2011/0153421 A1 | 6/2011 | Novikov et al. | |
| 2012/0253935 A1* | 10/2012 | Blom | 705/14.58 |

OTHER PUBLICATIONS

"Clustering Users in Twitter Based on Interests", Resarch paper, 2011; vwvw.nlpr.ia.ac.cn/2011papers/gnhy/nh4.pdf, downloaded on Sep. 19, 2012.
Assa, J. et al, "Displaying Data in Multidimensional Relevance Space with 2D Visualization Maps", Oct. 24, 1997.
Barkol, O et al, "Enterprise Collective: Connecting People via Content", Aug. 7, 2012.

* cited by examiner

*Primary Examiner* — Hares Jami
(74) *Attorney, Agent, or Firm* — Mannava & Kang, P.C.

(57) ABSTRACT

According to an example, data pertaining to a plurality of entities recommended for a user may be accessed, in which the data identifies relationships between the plurality of entities with respect to each other. In addition, a relevance map for the user that displays graphical representations of the plurality of entities over a substantially optimized use of space available for display of the graphical representations in the relevance map may be generated, in which the graphical representations of the plurality of entities are arranged in the relevance map according to a predetermined arrangement scheme.

12 Claims, 10 Drawing Sheets

```
┌─────────────────────────────────────────────────┐
│ ACCESS DATA PERTAINING TO ENTITIES RECOMMENDED FOR │
│      A FIRST USER, IN WHICH THE DATA IDENTIFIES    │
│         RELATIONSHIPS BETWEEN THE ENTITIES         │
│                        202                         │
└─────────────────────────────────────────────────┘
                        │
                        ▼
┌─────────────────────────────────────────────────┐
│  GENERATE A RELEVANCE MAP FOR THE FIRST USER THAT  │
│  SUBSTANTIALLY OPTIMIZES USE OF AVAILABLE SPACE FOR│
│   THE DISPLAY OF GRAPHICAL REPRESENTATIONS OF THE  │
│           ENTITIES IN THE RELEVANCE MAP            │
│                        204                         │
└─────────────────────────────────────────────────┘
```

DISPLAYING RECOMMENDED ENTITIES IN A RELEVANCE MAP

BACKGROUND

Recommender systems utilize information analytics techniques to predict the interests of its users based on the experience that has been acquired directly from the users or indirectly by the system's activity. In addition, recommender systems are designed to suggest items of interest to a user based upon the predicted interests. Particularly, recommender systems seek to predict the interest a user would find in an item, person, or social element based upon the properties of the item, the user's past experience, and similar users.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are methods and apparatuses for visualizing recommended entities. The methods and apparatuses disclosed herein may access data pertaining to a plurality of entities recommended for a user, in which the data identifies relationships between the plurality of entities with respect to each other, for instance, in a relevance graph. The methods and apparatuses disclosed herein may also generate a visualization of a relevance map for the user that displays graphical representations of the plurality of entities over a substantially optimized use of space available for display of the graphical representations in the relevance map. The graphical representations of the plurality of entities may be arranged in the relevance map according to a predetermined arrangement scheme, which may include an arrangement in which the graphical representations of the entities having greater levels of similarities may be arranged in relatively closer proximities with respect to each other as compared to graphical representations of entities having lesser levels of similarities. As another example, the predetermined arrangement scheme may include an arrangement in which the graphical representations of the plurality of entities may be arranged based on the average (e.g., affine) combination between the categories to which the plurality of entities are relevant.

The data pertaining to the plurality of entities recommended for the user may include data that has been collected and analyzed by a recommender system and in some instances, arranged in a relevance graph. The recommender system may be any of a number of conventional recommender systems that are designed to suggest items of interest to a user based upon past experience and similar users. Conventional recommender systems typically seek to predict the interest a user would find in an item, person, or social element they had not yet considered, based upon the properties of the item, the user's past experience, and similar users. Conventional recommender systems often present the recommended items in a linear ordering of interests sorted by their relevancy and with no context or ability to influence the results.

In contrast, the methods and apparatuses disclosed herein may generate relevance maps that visualize recommended entities in manners that provide context to the recommended entities as well as provide users with an ability to access additional information about the recommended entities. In addition, the recommended entities may be organized in a multi-dimensional layout such that similar entities are in relatively close proximities with respect to each other and are centered around real-time generated categories, without overlapping each other. The recommended entities may, however, be organized in other manners, such as based on an average combination between categories to which the recommended entities are relevant. Moreover, the recommended entities may be generated for particular users as the users seek recommended entity information.

Through implementation of the methods and apparatuses disclosed herein, users may be presented with relevance maps that are informative, aesthetically pleasing, and interactive.

Although particular reference is made throughout the present disclosure to various entities being depicted in a relevance map and/or a relevance map layer, it should be understood that discussions pertaining to the depictions of the various entities are intended to equivalently encompass depictions of graphical representations of the various entities instead of the various entities themselves. In this regard, recitations of the term "entities" with respect to the relevance map herein are to be construed as equivalently including the graphical representations of the entities on the relevance map.

Figure 1:
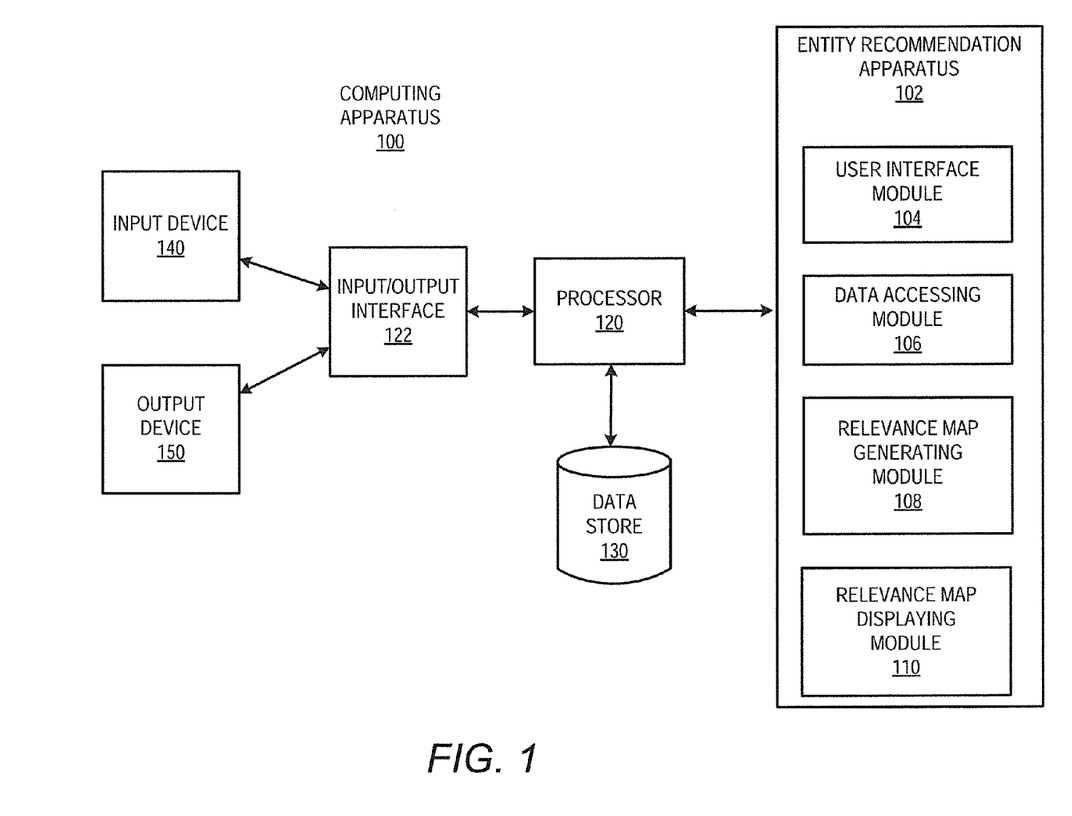
FIG. 1 depicts a simplified block diagram of a computing apparatus, which may implement various features disclosed herein, according to an example of the present disclosure.

With reference first to FIG. 1, there is shown a simplified block diagram of a computing apparatus 100, which may implement various features disclosed herein, according to an example. It should be understood that the computing apparatus 100 may include additional elements and that some of the elements depicted therein may be removed and/or modified without departing from a scope of the computing apparatus 100.

Generally speaking, the computing apparatus 100 may include one of a personal computer, a laptop computer, a tablet computer, a personal digital assistant, a cellular telephone, a server, and the like. The computing apparatus 100 may also include an entity recommendation apparatus 102, a processor 120, an input/output interface 122, a data store 130, an input device 140, and an output device 150. The entity recommendation apparatus 102 may include a user interface module 104, a data accessing module 106, a relevance map generating module 108, and a relevance map displaying module 110.

The processor 120, which may be a microprocessor, a micro-controller, an application specific integrated circuit (ASIC), and the like, is to perform various processing functions in the computing apparatus 100. One of the processing functions may include invoking or implementing the modules 104-110 of the entity recommendation apparatus 102 as discussed in greater detail herein below. According to an example, the entity recommendation apparatus 102 may be a hardware device, such as, a circuit or multiple circuits arranged on a board. In this example, the modules 104-110 may be circuit components or individual circuits. According to another example, the entity recommendation apparatus 102 may be software stored, for instance, in a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In this example, the modules 104-110 may be software modules stored in the memory. According to a further example, the modules 104-110 may be a combination of hardware and software modules.

The processor 120 may store the data in the data store 130 and may use the data in implementing the modules 104-110. The data store 130 may be volatile and/or non-volatile memory, such as DRAM, EEPROM, MRAM, phase change RAM (PCRAM), Memristor, flash memory, and the like. In addition, or alternatively, the data store 130 may be a device that may read from and write to a removable media, such as, a floppy disk, a CD-ROM, a DVD-ROM, or other optical or magnetic media.

The input/output interface 122 may include hardware and/or software to enable the computing apparatus 100 to receive instructions from the input device 140 and to communicate data to be displayed on the output device 150. The input device 140 may be, for instance, a user input device such as a keyboard, a mouse, a track pad, a microphone, etc. The output device 150 may include a display device on which a relevance map containing recommendations of entities may be displayed to a user.

Although not shown, the computing apparatus 100 may also be in communication with a network for facilitating communication of data to and/or from the computing apparatus 100. The network may include any suitable network for facilitating communication of data such as the Internet, a cellular network, a local area network, a wide area network, etc. In addition, the computing apparatus 100 may be in communication with the network through the input/output interface 122, which may include hardware and/or software modules to facilitate the communication of the data over the network.

Figure 2:
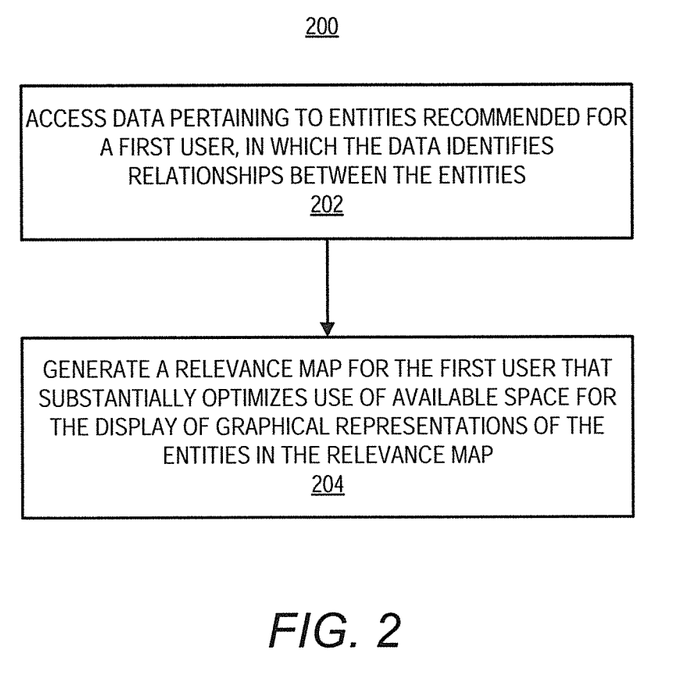
FIG. 2 depicts a flow diagram of a method for visualizing recommended entities, according to an example of the present disclosure.

Various manners in which the modules 104-110 of the entity recommendation apparatus 102 may be implemented are discussed in greater detail with respect to the method 200 depicted in FIG. 2. FIG. 2, more particularly, depicts a flow diagram of a method 200 for visualizing recommended entities, according to an example. It should be apparent to those of ordinary skill in the art that the method 200 represents a generalized illustration and that other operations may be added or existing operations may be removed, modified or rearranged without departing from a scope of the method 200. Although particular reference is made to the computing apparatus 100 depicted in FIG. 1 as being an apparatus that may implement the operations described in the method 200, it should be understood that the method 200 may be performed in differently configured apparatuses without departing from a scope of the method 200.

At block 202, data pertaining to a plurality of entities recommended for a user may be accessed, for instance, by the data accessing module 106, in which the data identifies relationships between the plurality of entities with respect to each other. The data may have previously been stored in the data store 130 and may thus be accessed from the data store 130. In another example, the data may be stored in a location remote from the computing apparatus 100, for instance, in an external database that the computing apparatus 100 may access over a network. In any regard, the data may be stored in a relevance graph or type of data structure that contains information as to, for instance, which entities are relevant to which other entities, which entities have greater relevance to which other entities, etc.

According to an example, the data pertaining to the plurality of entities recommended for the user may include data that is collected by a recommender system (not shown). The recommender system may be a system that is separate from the computing apparatus 100 or a system that is integrated with the computing apparatus 100. By way of particular example, for instance, the recommender system may be a hardware and/or a software module in the computing apparatus 100 that may find recommended entities for the particular user. As another example, the recommender system may be a hardware and/or a software module in a separate computing apparatus (not shown) to which the computing apparatus 100 is connected via a network.

Generally speaking, a recommender system may seek to predict the interest a user may find in an entity, such as a person, social element, book, music, etc. That is, the recommender system may seek to predict which of a number of entities a user may find of interest. The recommender system may utilize information analytics techniques based upon the properties of the entity, the user's past experience, past experiences of similar users, etc. The prediction may therefore be based upon experiences that have been acquired directly from a group of users or indirectly by the recommender system's activities. For instance, the recommender system may record the activities of the users and/or may request that the users provide information through, for instance, a questionnaire, to build representative profiles of the users. According to an example, the data pertaining to the plurality of entities may be obtained from a commercially available or otherwise accessible recommender system. Conventional recommender systems often use a linear ordering of the interests of the users sorted by their relevancy. In addition, conventional recommender systems typically provide the recommended items with no context and no ability to influence the results, and it may thus be relatively difficult to obtain useful information from conventional recommender systems.

In contrast, and as discussed in greater detail herein, according to examples presented herein, recommended entities may be presented to a user through a relevance map, that not only may provide a visualization of the recommended entities, but also the context as to why the entities may have been recommended for the user. The relevance maps disclosed herein may also provide an indication as to which of the entities are similar to each other. In one regard, therefore, the user may determine which of the recommended entities are of most interest to the user as determined from the context associated with the entities. In addition, the user may affect the entities that are recommended for the user by modifying the context that the user construes as being currently relevant to the user. For instance, if the user is currently in the mood for recommendations for movies that are comedies, the movies that are predicted to be the most relevant to the user may be directed to comedies. In this regard, the types of data accessed at block 202 may be based upon input received from a user, such as, the type of recommended entities that the user is currently seeking.

At block 204, a relevance map for the user may be generated, for instance, by the relevance map generating module 108. The relevance map may be generated to display graphical representations of the plurality of entities over substantially optimized use of space available for display of the graphical representations in the relevance map according to a predetermined arrangement scheme. According to an example, the predetermined arrangement scheme may cause the graphic representations of the entities to be arranged in the relevance map such that the graphical representations of the entities having greater levels of similarities are arranged in relatively closer proximities with respect to each other as compared to graphical representations of entities having lesser levels of similarities. As another example, the predetermined arrangement scheme may cause the graphical representations of the plurality of entities to be arranged based on the average (e.g., affine) combination between the categories to which the plurality of entities are relevant. The plurality of entities may include other users, items, or a combination of other users and items. The items may include, for instance, books, publications, movies, songs, electronic equipment, sporting equipment, destinations, restaurants, software applications, etc.

According to an example, the plurality of entities may correspond to various categories of interest of the user and the graphical representations of the plurality of entities may be grouped, e.g., according to the predetermined arrangement scheme, according to the categories of interest to which the plurality of entities correspond. In addition, contextual information pertaining to the various categories of interest may also be graphically displayed in the relevance map, such that similar ones of the plurality of entities are grouped around the corresponding graphically displayed contextual information. In one regard, through implementation of the relevance map generated at block 204, which the relevance map displaying module 110 may display on the output device 150, a user may easily determine which of the plurality of recommended entities correspond to which of the categories of interest, and may thus determine which of the recommended entities is of interest to the user.

According to an example, the use of the space available for the display of the graphical representations may substantially be optimized through arrangement of the different groups of recommended entities to occupy as much space as possible in the relevance map. In addition, the graphical representations of the plurality of entities may be displayed in the relevance map such that overlap among the plurality of entities is substantially avoided. Overlap between the graphical representations of the plurality of entities and the contextual information, which may be in the form of tags and/or categories, may also be substantially avoided in the relevance map.

The method 200 may also be implemented for other users to generate relevance maps for the other users. The relevance maps for the other users may be different for each of the other users even though the data accessed at block 202 may be accessed from the same database and/or recommender system because the data pertaining the recommended entities may differ for the different users. In this regard, different entities may be recommended for different users.

Figure 3A:
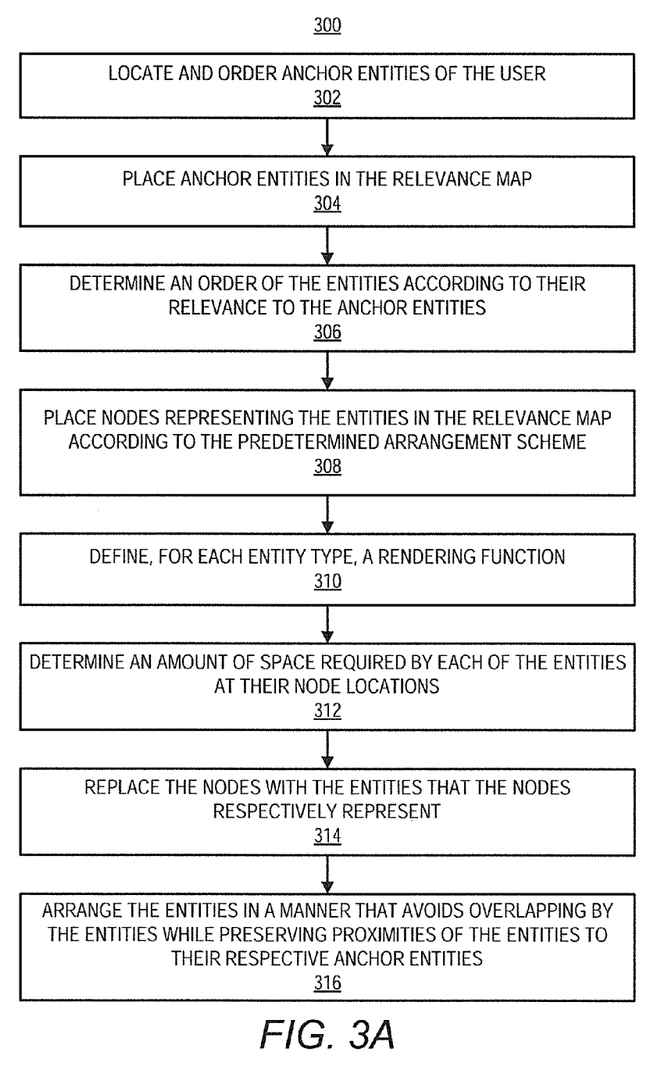
FIGS. 3A and 3B, respectively, show flow diagrams of methods for generating a relevance map, according to two examples of the present disclosure.
Figure 3B:
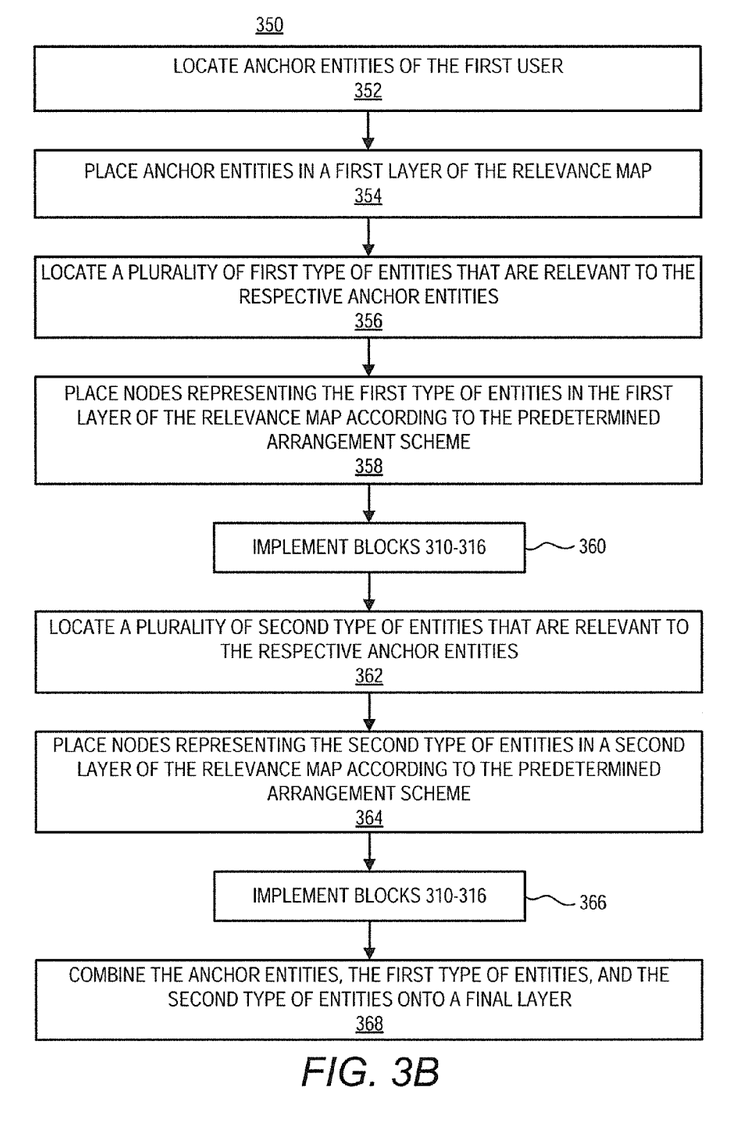

Turning now to FIGS. 3A and 3B, there are respectively shown flow diagrams of methods 300 and 350 for generating a relevance map, according to two examples. The methods 300 and 350 may therefore provide more detailed descriptions of the operations performed at block 204 in FIG. 2, according to two examples. The methods 300 and 350 differ from each other in that in the method 300, a single layer may be used in the generation of the relevance map, whereas in the method 350, a plurality of layers may be used in the generation of the relevance map. It should be apparent to those of ordinary skill in the art that the methods 300 and 350 represent generalized illustrations and that other steps may be added or existing steps may be removed, modified or rearranged without departing from the scopes of the methods 300 and 350.

With reference first to FIG. 3A, at block 302, anchor entities of the user may be located and ordered, for instance, from a relevance graph or other data structure containing data pertaining to a plurality of entities and their relevancies with respect to each other. The anchor entities of the user may include those entities (of the plurality of entities accessed at block 202 (FIG. 2)) that may be of greatest interest or relevance to the user. By way of example, the anchor entities may include publications authored by the user, books that the user has read, movies that the user has recently watched, movies having the highest ratings by the user, songs that the user has indicated as having the highest ratings, people listed in a contacts list of the user, people with whom the user has communicated via email, etc. In other examples, the anchor entities may include entities that are directly related to any of the entities discussed above, entities having profiles that are similar to a profile of the user, etc. According to an example, at block 302, the relevance map generating module 108 may select a predetermined number of anchor entities, in which the predetermined number of anchor entities may be selected, for instance, to provide the user with a relatively broad range of recommended entities while substantially avoiding display of an overly excessive number of recommended entities.

At block 304, the located and ordered anchor entities may be placed in the relevance map, in which the anchor entities may form seed locations around which entities corresponding or relevant to recommended entities for the user may be provided in the relevance map. According to an example, the relevance map generating module 108 may place the anchor entities in the relevance map in multiple dimensions using a distance measure between the anchor entities. Particularly, the anchor entities may be positioned in the relevance map such that the anchor entities are substantially spread out across the space defined by the relevance map, and thus occupy a relatively large portion of the relevance map. According to an example, the anchor entities may be embedded in the relevance map in multiple dimensions through use of dimensionality reduction measures such as multi-dimensional scaling (MDS), in which the embedding serves as seed coordinates for each anchor entity.

At block 306, an ordering of the entities according to their relevancy to the located and ordered anchor entities may be determined. According to an example, the relevance map generating module 108 may make this determination based upon similarities between the plurality of entities and the anchor entities identified in the data accessed at block 202. For instance, the relevance map generating module 108 may analyze the data accessed at block 202 to locate, from the relevance graph, the entities that are similar or relevant to the respective anchor entities. The relevance map generating module 108 may also analyze the data accessed at block 202 to locate the entities having the greatest levels of similarity to the anchor entities. The relevance map generating module 108 may further or alternatively analyze the data accessed at block 202 to determine the average (e.g., affine) combinations between the anchor entities with respect to the entities. The relevance map generating module 108 may also determine which entities may be secondarily connected, for instance, as a derivative of the similarity measure, to which of the anchor entities. These auxiliary entities may be added to the relevance map to enhance the context of various parts of the relevance map and to also increase the likelihood of providing recommended entities that the user may not have previously considered.

At block 308, nodes representing the entities determined at block 306 may be placed in the relevance map according to a predetermined arrangement scheme. Various examples of the predetermined arrangement scheme are discussed above. For instance, nodes representing a first group of entities that have been determined as being relevant to a first anchor entity may be positioned in relatively close proximity to the first anchor entity, nodes representing a second group of entities that have been determined as being relevant to a second anchor entity may be positioned in relatively close proximity to the second anchor entity, and so forth. In other words, the nodes may be positioned with respect to the anchor entities to indicate that the nodes may be related to and/or similar to the respective anchor entities. According to an example, the nodes may be placed through traversal of the relevance map in a predetermined order, filling a packing buffer to avoid overlap by the nodes, and performing a search for a free location in response to an overlap by multiple nodes. The search for a free location in response to an overlap by multiple nodes may include a search from a closest free location and may include, for instance, a greedy search, a spiral based search, etc. In addition, or alternatively, the relevance map may be traversed from each anchor entity and a minimum spanning tree (MST) may be calculated to the rest of the nodes, in which the nodes are seed coordinates for the remaining entities. The seed coordinates of the remaining entities may also be a weighted combination of the reachable anchor entities.

In addition, at block 308, edges representing symbolic relationships between the entities and the anchor entities may also be placed in the relevance map. The symbolic relationships may be, for instance, employer-employee, reader-book, author-paper, similarity between entities, etc. In addition, the relevance map may be augmented with additional information, for instance, to add context to the recommendations. The additional information may include, for instance, nodes representing other entities that were not determined to be directly relevant to the anchor entities, but which may be of interest to the user. These entities may be determined from a weighted mean of the similarities between the entities and the anchor entities. By way of example, these entities may be determined from a weighted mean of the similarities between the papers and their categories of papers authored by entities that have been identified as being relevant to the anchor entities with respect to papers and categories of papers authored by the user. The additional information may also include contextual information, such as categories or tags, and new edges that define the context.

At block 310, a rendering function, which may be textual, pictorial, or a combination of both, may be defined for each entity type. In addition, at block 312, an amount of space required by each of the entities following application of the rendering function at their node locations may be determined. That is, at block 312, a determination may be made as to the amount of screen real estate each of the entities requires following application of the rendering function. Furthermore, at block 314, the nodes may be replaced with the entities that the nodes respectively represent in the relevance map. Still further, at block 316, the entities may be arranged in the relevance map in a manner that may avoid overlapping by the entities while preserving proximities of the entities to their respective anchor entities.

Turning now to FIG. 3B, there is shown a flow diagram of a method 350 of generating a relevance map, according to another example. The description of the method 350 is made with respect to the diagrams of the relevance map layers depicted in FIGS. 4A-4D and the relevance map depicted in FIG. 5. It should, however, be clearly understood that the features depicted in FIGS. 4A-4D and 5 and references to those features with respect to the description of the method 350 are for purposes of illustration only and should thus not be construed as limiting the method 350 in any respect.

Figure 4A:
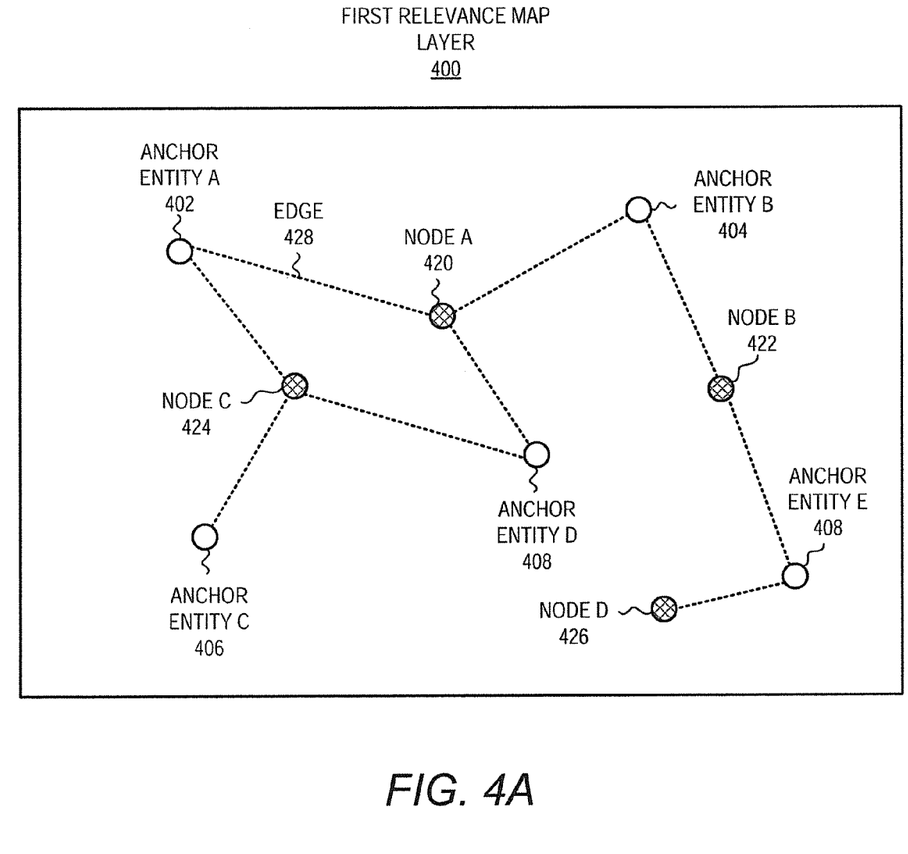
FIGS. 4A-4D, respectively, illustrate diagrams of relevance map layers at various stages during implementation of the method depicted in FIG. 3B, according to examples of the present disclosure.

At block 352, anchor entities of the user may be located. The anchor entities of the user may be located in any of the manners as discussed above with respect to block 302 in FIG. 3A. In addition, at block 354, the located anchor entities may be placed in a first layer 400 of the relevance map, for instance as shown in FIG. 4A. By way of particular example, as shown in the diagram FIG. 4A, five (5) anchor entities A-E 402-408 have been placed in a substantially spread arrangement across the relevance map first layer 400 to therefore occupy a majority of the space available in the first relevance map layer 400.

At block 356, the entities of a plurality of first type of entities, for instance, accessed at block 202, that are relevant to the anchor entities located at block 352 may be located. That is, the relevance map generating module 108 may locate entities of a first type that are similar or relevant to the respective located anchor entities from the relevance graph. The first type of entity may include, for instance, identities of other users. In addition, the relevance map generating module 108 may locate the entities of the first type at block 356 in manners similar to those discussed above with respect to block 306 in FIG. 3A.

At block 358, nodes representing the entities of the first type determined at block 356 may be placed in the first relevance map layer according to a predetermined arrangement scheme as discussed above. The nodes may additionally be placed in the first relevance map layer in any of the manners as discussed above with respect to block 308 in FIG. 3A. In the diagram 400 depicted in FIG. 4A, four (4) nodes A-D 420-426 have been placed in relatively close proximities to the respective anchor entities 402-408 to which the entities to which the nodes 420-426 represent have been determined to be similar. In addition, edges 428 have been depicted as connecting the nodes 420-426 to respective ones of the anchor entities 402-408. The edges 428 represent symbolic relationships, such as, employer-employee, reader-book, author-paper, similarity between entities, etc., between respective ones of the nodes 420-426 and the anchor entities 402-408. Thus, for instance, the entity represented by the node A 420 may have a symbolic relationship with the anchor entities A, B and D 402, 404, 408. As such, the node A 420 may be positioned substantially between those anchor entities 402, 404, and 408.

The anchor entities 402-408 and the nodes 420-426 may generally be construed as placeholders or seed locations for the entities that they represent. Particularly, the anchor entities 402-408 and the nodes 420-426 may generally identify multi-dimensional coordinates in the first relevance map layer 400 where the entities are to be positioned in the first relevance map layer 400. The anchor entities 402-408 and the nodes 420-426 may thus be replaced and arranged as discussed above with respect to blocks 310-316 in FIG. 3A, as indicated at block 360.

Figure 4B:
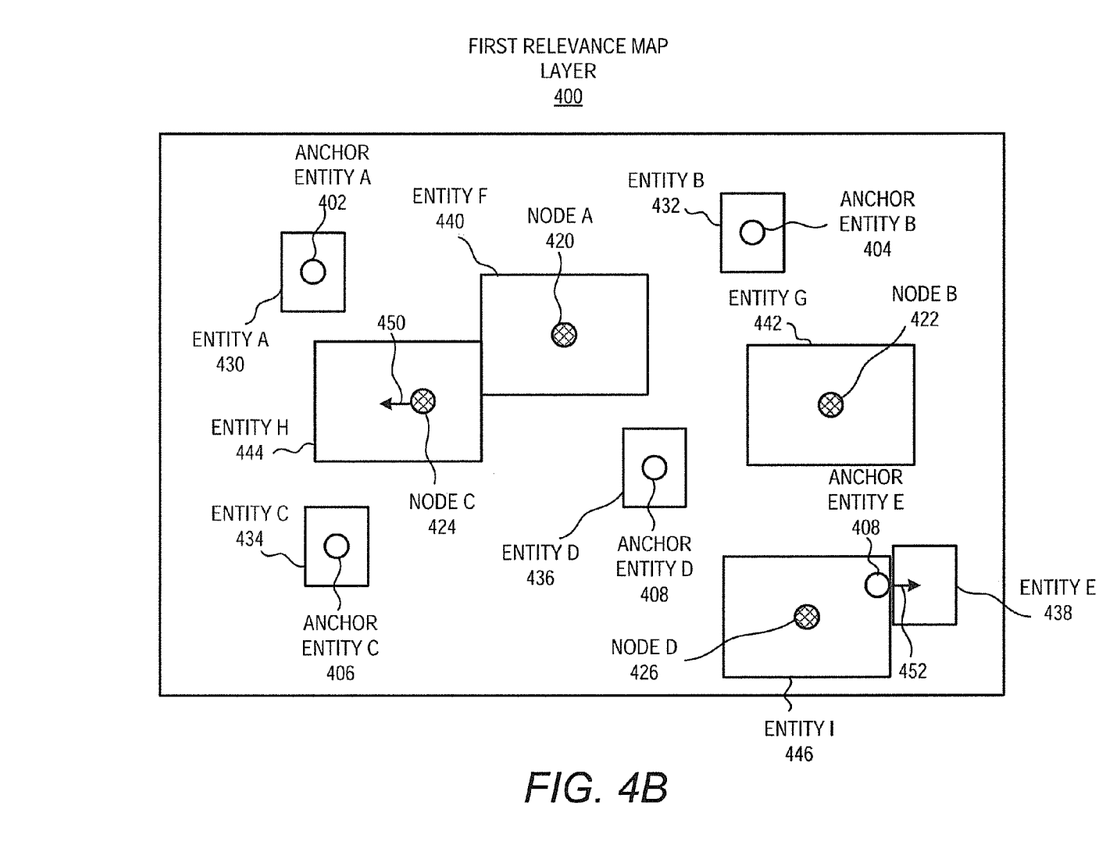

A particular example of the replacement and arrangement of the anchor entities 402-408 and the nodes 420-426 from FIG. 4A is depicted in FIG. 4B, which may show a state of the first relevance map layer 400 following block 360, according to an example. Particularly, as shown in FIG. 4B, the entities A-I 430-446 following application of the rendering function (block 310) may be depicted as occupying respective amounts of screen real estate around the locations of their respective anchor entities 402-408 and nodes 420-426. In addition, the entity H 444 may be moved to the left as denoted by the arrow 450 to avoid overlap with the entity F 440. Likewise, the entity E 438 may be moved to the right as denoted by the arrow 452 to avoid overlap with the entity I 446.

At block 362, the entities of a plurality of second type of entities, for instance, accessed at block 202, that are relevant to the anchor entities located at block 352 may be located. That is, the relevance map generating module 108 may locate the entities of a second type that are similar or relevant to which the respective located anchor entities. The second type of entity may differ from the first type of entity and may include, for instance, recommended items. In addition, the relevance map generating module 108 may determine the entities of the second type at block 362 in manners similar to those discussed above with respect to block 306 in FIG. 3A.

Figure 4C:
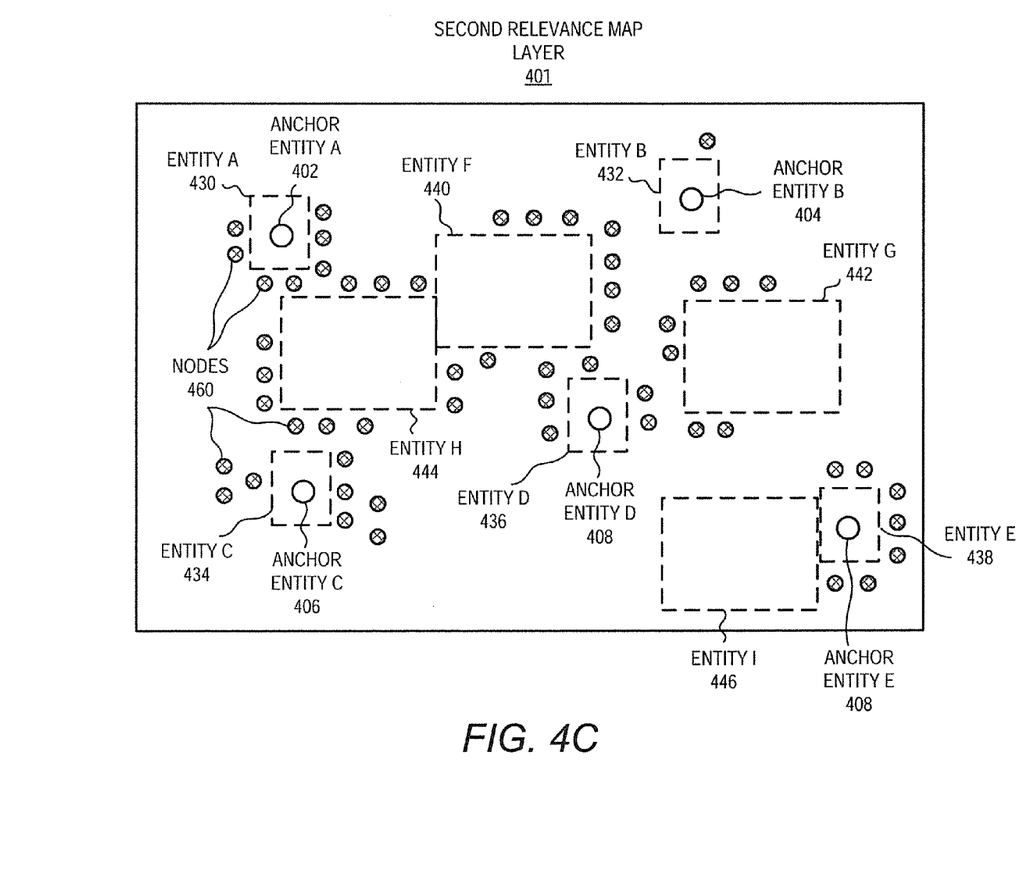

At block 364, nodes representing the entities of the second type determined at block 362 may be placed in a second relevance map layer according to a predetermined arrangement scheme. The nodes may be placed in the second relevance map layer in any of the manners as discussed above with respect to block 308 in FIG. 3A. According to an example, at block 364, the nodes representing the entities of the second type determined at block 362 may be placed in a second layer 401 of the relevance map, for instance, as shown in FIG. 4C. Particularly, as shown in the second relevance map layer 401 in FIG. 4C, nodes 460 representing the entities of the second type determined at block 362 may be positioned at various locations with respect to the anchor entities 402-408. According to an example, the locations and the spaces occupied by the entities 430-446 may be taken into consideration during placement of the nodes 460, for instance, to substantially avoid overlap by the nodes 460 with the entities 430-446, as well as to avoid overlap by the nodes 460 with other nodes 460.

Although not shown in FIG. 4C, edges, such as the edges 428 depicted in FIG. 4A, connecting the nodes 460 to respective ones of the anchor entities 402-408 may also be depicted in the second relevance map layer 401. The edges may represent symbolic relationships, such as, employer-employee, reader-book, author-paper, similarity between entities, etc., between respective ones of the nodes 460 and the anchor entities 402-408.

Similarly to the anchor entities 402-408 and the nodes 420-426 discussed above with respect to FIG. 4B, the nodes 460 may generally be construed as being placeholders or seed locations for the entities that they represent. Particularly, the nodes 460 may generally identify two-dimensional coordinates in the second relevance map layer 401 where the entities of the second type are to be positioned in the second relevance map layer 401. The nodes 460 may thus be replaced and arranged as discussed above with respect to blocks 310-316 in FIG. 3A, as indicated at block 366.

Figure 4D:
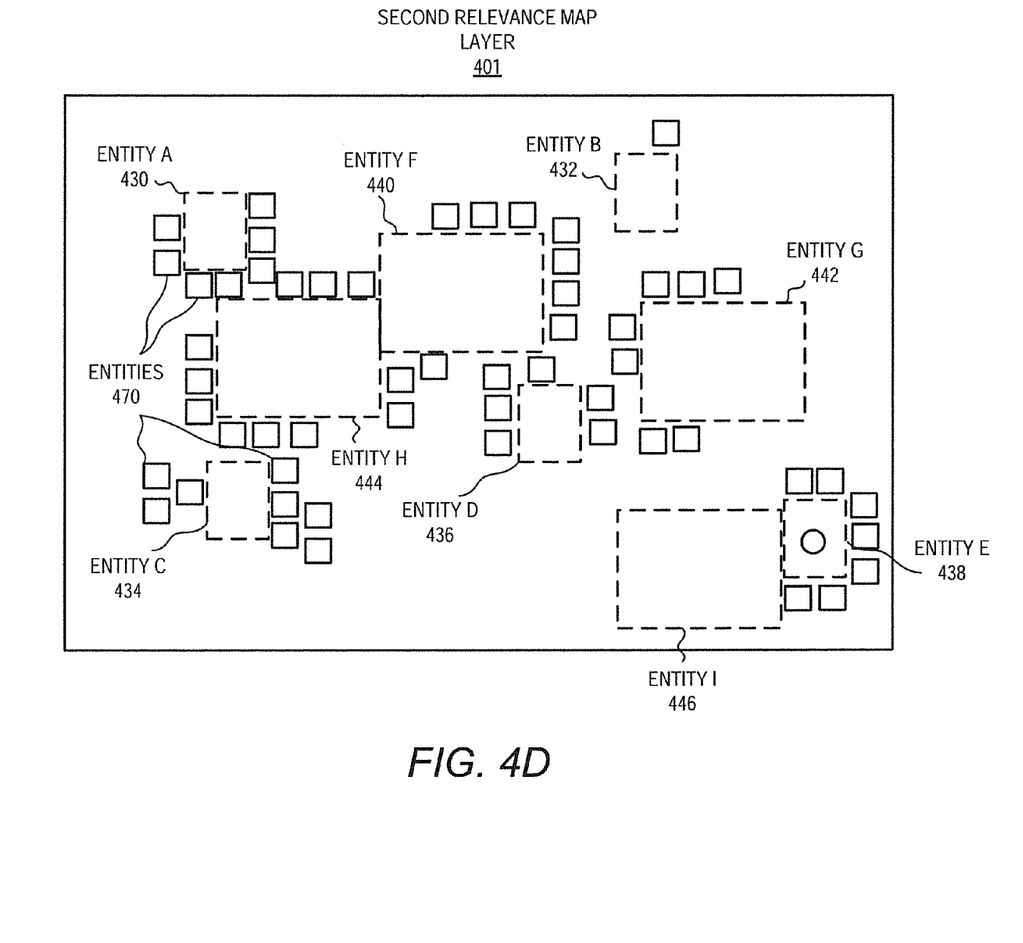

A particular example of the replacement and arrangement of the anchor entities 402-408 and the nodes 460 are depicted in FIG. 4D, which may show a state of the second relevance map layer 401 following block 366, according to an example. Particularly, as shown in FIG. 4D, the entities 470 of the second type following application of the rendering function (block 310) may occupy respective amounts of screen real estate around the locations of the entities 430-438 corresponding to the anchor entities 402-408. In addition, the entities 470 may be positioned in various locations and may occupy various amounts of space in the second relevance map 401 while avoiding overlap with the entities 440-446, which may or may not be depicted in the second relevance map layer 401.

Figure 5:
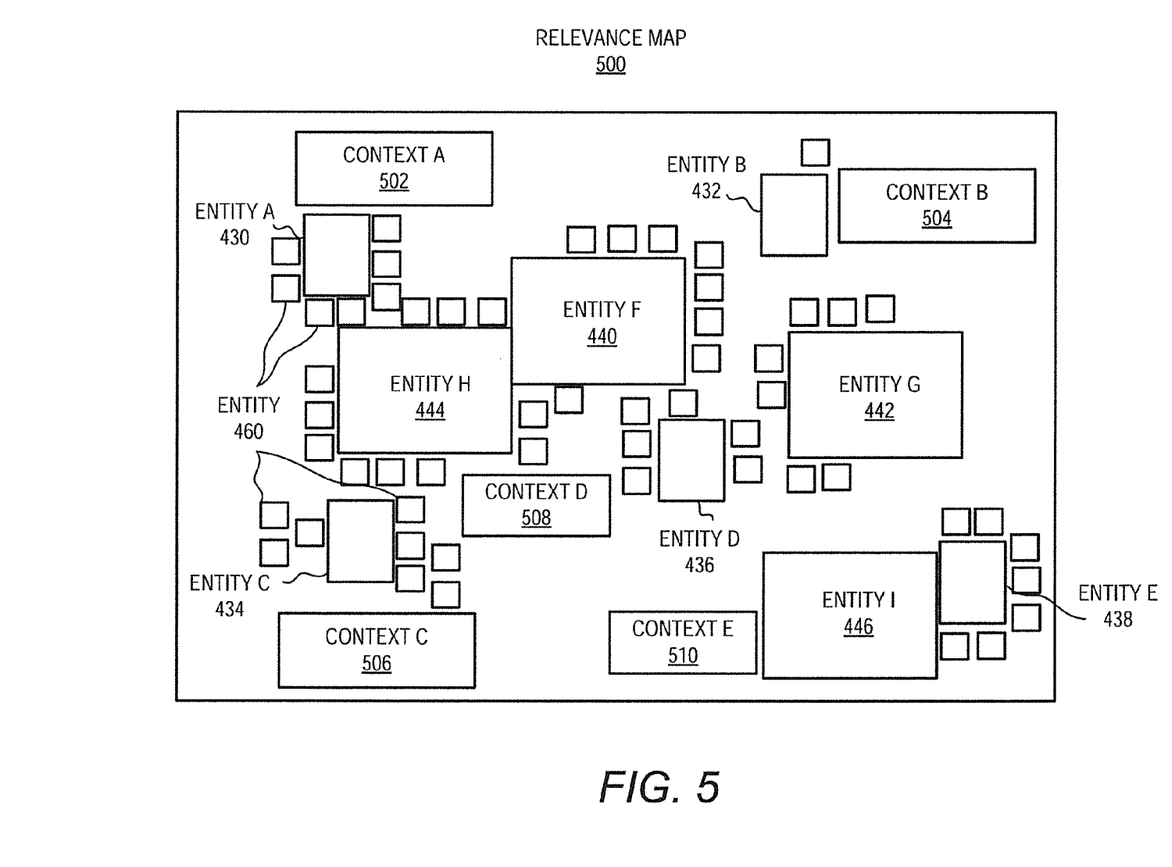
FIG. 5 illustrates a relevance map, according to an example of the present disclosure.

At block 368, the anchor entities, the entities in the first relevance map layer, and the entities in the second relevance map layer may be combined onto a final layer of the relevance map while avoiding overlap by any of the entities. An example of a relevance map 500 onto which the anchor entities 430-438, the entities 440-446 in the first relevance map layer 400, and the entities 460 in the second relevance map layer 401 may have been provided, according to an example, is depicted in FIG. 5. Also shown in the relevance map 500 are a plurality of contexts A-E 502-510. The contexts 502-510 may represent contextual information, such as categories or tags, of respective groups of the entities 430-460. According to an example, each of the contexts 502-510 may be related to a respective anchor entity 402-408, such that, for instance, the contexts 502-510 are general descriptions or tags of the anchor entities 402-408. By way of particular example, the contexts 502-510 may identify various divisions in an organization, various specializations by the entities representing users depicted in the relevance map 500, various categorizations of movies, music, and/or books, etc.

According to an example, the contexts 502-510 may be placed in a third layer (not shown) of the relevance map, in which the contexts 502-510 may be placed in relatively close proximities to locations in the third layer corresponding to the locations of the respective groups of entities in the first layer and the second layer of the relevance map. In this example, the combining at block 368 in FIG. 3B may also include combining the contexts 502-510 with the anchor entities 430-438, the plurality of first type of entities 440-446, and the plurality of second type of entities 460 onto the final layer of the relevance map 500 while avoiding overlap by any of the entities 430-446, 460 and the contexts 502-510.

Although not explicitly discussed herein, in other examples, additional types of entities that are relevant to the anchor entities may be determined and placed in the first or second layers, or in additional layers of the relevance map in a manner similar to those described above with respect to the method 350 in FIG. 3B. In these examples, the additional types of entities may be combined with the entities and the anchor entities as described with respect to block 368.

In addition, the generated relevance map 500 may be displayed on the output device 150, for instance, by the relevance map displaying module 110. Furthermore, instructions pertaining to user interactions with the relevance map 500 may be received through the user interface module 104. The user interface module 104 may also implement the user interactions on the relevance map 500. By way of particular example, a user interaction with the relevance map 500 may include an instruction for additional information pertaining to a particular entity displayed on the relevance map 500. In response to receipt of such an instruction, the user interface module 104 may display additional information pertaining to a selected one of the entities displayed in the relevance map 500. The additional information may be displayed, for instance, in a pop-up window near the selected entity, and may include information, such as an author of the paper, a date of publication, managers of an author of the paper, other authored papers, etc.

Some or all of the operations set forth in the methods 200, 300, and 350 may be contained as a utility, program, or subprogram, in any desired computer accessible medium. In addition, the methods 200, 300 and 350 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 6:
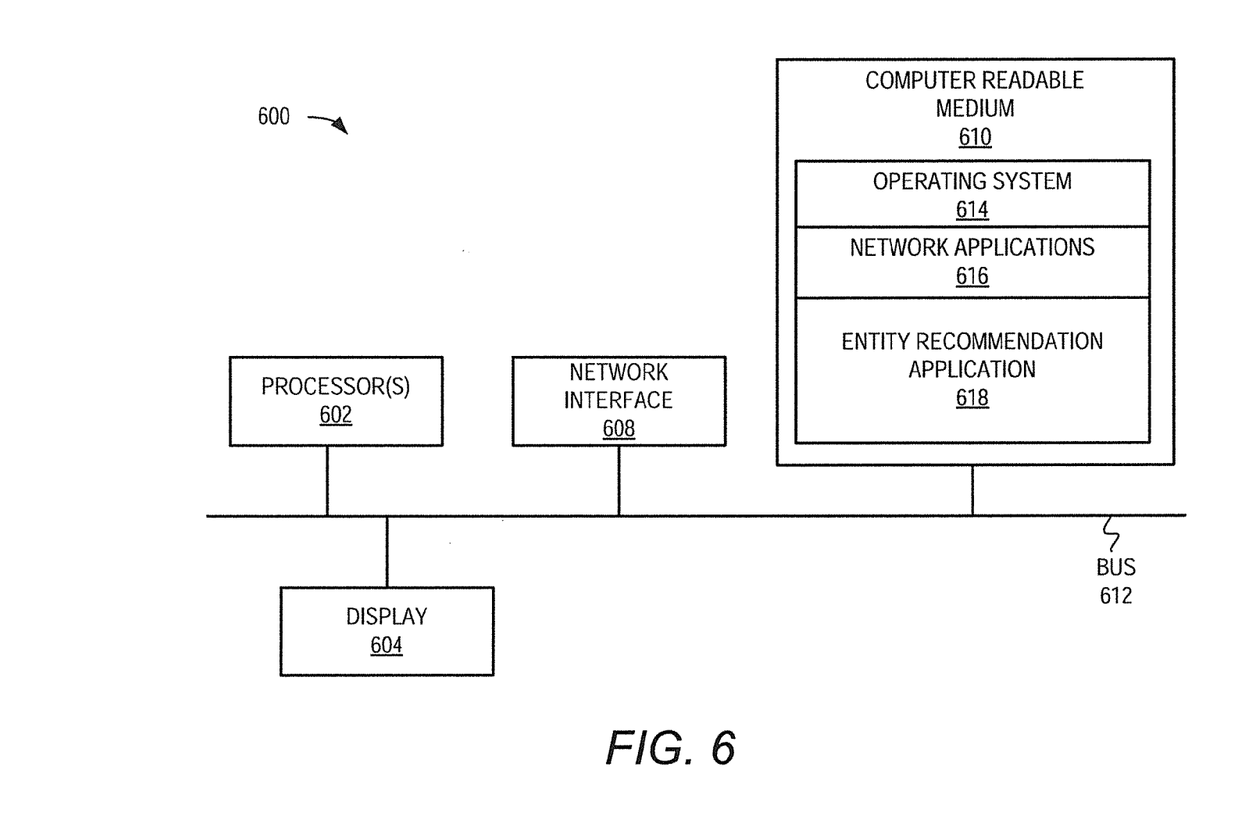
FIG. 6 illustrates a schematic representation of a computing device, which may be employed to perform various functions of the computing apparatus depicted in FIG. 1, according to an example of the present disclosure.

Turning now to FIG. 6, there is shown a schematic representation of a computing device 600, which may be employed to perform various functions of the computing apparatus 100 depicted in FIG. 1, according to an example. The device 600 may include a processor 602, a display 604, such as a monitor; a network interface 608, such as a Local Area Network LAN, a wireless 802.11x LAN, a 3G mobile WAN or a WiMax WAN; and a computer-readable medium 610. Each of these components may be operatively coupled to a bus 612. For example, the bus 612 may be an EISA, a PCI, a USB, a FireWire, a NuBus, or a PDS.

The computer readable medium 610 may be any suitable medium that participates in providing instructions to the processor 602 for execution. For example, the computer readable medium 610 may be non-volatile media, such as an optical or a magnetic disk; volatile media, such as memory. The computer-readable medium 610 may also store an operating system 614, such as Mac OS, MS Windows, Unix, or Linux; network applications 616; and a management application 618. The operating system 614 may be multi-user, multiprocessing, multitasking, multithreading, real-time and the like. The operating system 614 may also perform basic tasks such as recognizing input from input devices, such as a keyboard or a keypad; sending output to the display 604; keeping track of files and directories on the computer readable medium 610; controlling peripheral devices, such as disk drives, printers, image capture device; and managing traffic on the bus 612. The network applications 616 may include various components for establishing and maintaining network connections, such as machine-readable instructions for implementing communication protocols including TCP/IP, HTTP, Ethernet, USB, and FireWire.

The entity recommendation application 618 may provide various components for generating a relevance map that graphically depicts recommended entities for a user and for displaying the generated relevance map, as described above with respect to the methods 200, 300, and 350 in FIGS. 2, 3A, and 3B. The entity recommendation application 618 may thus include the entity recommendation apparatus 102 depicted in FIG. 1. In this regard, the entity recommendation application 618 may include the user interface module 104, the data accessing module 106, the relevance map generating module 108, and the relevance map displaying module 110. In certain examples, some or all of the processes performed by the entity recommendation application 618 may be integrated into the operating system 614. In certain examples, the processes may be at least partially implemented in digital electronic circuitry, or in computer hardware, machine-readable instructions (including firmware and/or software), or in any combination thereof.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for visualizing recommended entities, said method comprising:
   accessing data pertaining to a plurality of entities recommended for a user, wherein the data identifies relationships between the plurality of entities with respect to each other; and
   generating a relevance map for the user according to a predetermined arrangement scheme by:
      identifying anchor entities of the user;
      placing the anchor entities in the relevance map;
      placing, in the relevance map, nodes representing the plurality of entities in respective proximities to the anchor entities according to their respective relevancies to the anchor entities through traversal of a relevance graph in a predetermined order, filling a packing buffer to avoid overlap by the nodes, and performing a search for a free location in response to an overlap by multiple nodes;
      defining, for each entity type, a rendering function;
      determining an amount of space required by each of the plurality of entities in the relevance map at the respective node locations of the plurality of entities based upon the defined rendering function for the plurality of entities;
      replacing the nodes with the entities that the nodes respectively represent; and
      arranging the plurality of entities in the relevance map in a manner that avoids overlap by the plurality of entities with respect to each other while substantially preserving proximities of the plurality of entities to their respective anchor entities.

2. The method according to claim 1, wherein the plurality of entities comprise other users, items, or a combination of the other users and the items.

3. The method according to claim 1, wherein generating the relevance map further comprises:
   locating and ordering the anchor entities of the user from a relevance graph;
   determining an order of the entities of the plurality of entities according to their respective relevancies to the located and ordered anchor entities; and
   wherein placing the nodes comprises placing the nodes according to the determined order of the entities.

4. The method according to claim 1, wherein generating the relevance map further comprises:
   placing the located anchor entities in a first layer of the relevance map;

locating entities of a plurality of first type of entities that are relevant to the respective anchor entities of the located anchor entities; and placing nodes representing the plurality of first type of entities in the first layer of the relevance map according to the predetermined arrangement scheme.

5. The method according to claim 4, further comprising:

locating entities of a plurality of second type of entities that are relevant to the respective anchor entities of the located anchor entities; and placing nodes representing the plurality of second type of entities in a second layer of the relevance map in according to the predetermined arrangement scheme.

6. The method according to claim 5, further comprising:

defining, for each entity type, a rendering function;

determining an amount of space required by each of the plurality of entities in the relevance map at the respective node locations of the plurality of entities based upon the defined rendering function for the plurality of entities;

replacing the nodes with the entities that the nodes respectively represent;

arranging the plurality of first type of entities and the plurality of second type of entities in the respective first layer and second layer of the relevance map in a manner that avoids overlap by the plurality of first type of entities with respect to each while substantially preserving proximities of the plurality of first type of entities and the plurality of second type of entities to their respective anchor entities; and combining the anchor entities, the plurality of first type of entities, and the plurality of second type of entities onto a final layer of the relevance map while avoiding overlap by the entities.

7. The method according to claim 6, further comprising:

placing contextual information identifying categories of respective groups of entities in a third layer of the relevance map in relatively close proximities to locations in the third layer corresponding to the locations of the respective groups of entities in the first layer and the second layer of the relevance map; and wherein the combining further comprises combining the contextual information with the anchor entities, the plurality of first type of entities, and the plurality of second type of entities onto the final layer of the relevance map while avoiding overlap by any of the entities and the contextual information.

8. The method according to claim 1, further comprising:

displaying additional information pertaining to a selected one of the plurality of entities displayed in the relevance map in response to receipt of an instruction for the additional information.

9. An apparatus for visualizing recommended entities, said apparatus comprising:

a memory on which is stored machine readable instructions to:

access data pertaining to a plurality of entities recommended for a user, wherein the data identifies relationships between the plurality of entities with respect to each other;

locate anchor entities of the user;

locate entities of a plurality of first type of entities that are relevant to the respective located anchor entities; and generate a relevance map for the user according to a predetermined arrangement scheme, wherein to generate the relevance map, the machine readable instructions are further to:

place the located anchor entities in a first layer of the relevance map;

place, in the relevance map, nodes representing the plurality of first type of entities in respective proximities to the anchor entities according to their respective relevancies to the anchor entities in the first layer of the relevance map according to the predetermined arrangement scheme;

define a rendering function for the plurality of first type of entities;

determine an amount of space required by each of the plurality of first type of entities in the relevance map at the respective node locations of the plurality of first type of entities based upon the defined rendering function;

replace the nodes with the entities that the nodes respectively represent; and arrange the plurality of first type of entities in the first layer of the relevance map in a manner that avoids overlap by the plurality of first type of entities with respect to each other while substantially preserving proximities of the plurality of first type of entities to their respective anchor entities; and a processor to implement the machine readable instructions.

10. The apparatus according to claim 9, wherein the machine readable instructions are further to:

locate entities of a plurality of second type of entities that are relevant to the respective anchor entities of the located anchor entities;

place nodes representing the plurality of second type of entities in a second layer of the relevance map according to the predetermined arrangement scheme;

define a rendering function for the plurality of second type of entities;

determine an amount of space required by each of the plurality of second type of entities in the second layer of the relevance map at the respective node locations of the plurality of second type of entities based upon the defined rendering function for the plurality of second type of entities;

replace the nodes with the entities of the second type that the nodes respectively represent; and arrange the plurality of second type of entities in the second layer of the relevance map in a manner that avoids overlap by the plurality of second type of entities with respect to each other while substantially preserving proximities of the plurality of second type of entities to their respective anchor entities.

11. The apparatus according to claim 10, wherein the machine readable instructions are further to:

combine the anchor entities, the plurality of first type of entities, and the plurality of second type of entities onto a final layer of the relevance map while avoiding overlap by the entities.

12. A non-transitory computer readable storage medium on which is stored machine readable instructions that when executed by a processor are to:

access data pertaining to a plurality of entities recommended for a user, wherein the data identifies relationships between the plurality of entities with respect to each other;

locate anchor entities of the user;

locate entities of a plurality of first type of entities that are relevant to the respective located anchor entities; and generate a relevance map for the user that according to a predetermined arrangement scheme, wherein to generate the relevance map, the machine readable instructions are further to cause the processor to:

place the anchor entities in the relevance map;

place, in the relevance map, nodes representing the plurality of first type of entities in respective proximities to the anchor entities according to their relevancies to the anchor entities through traversal of a relevance graph in a predetermined order, filling a packing buffer to avoid overlap by the nodes, and performing a search for a free location in response to an overlay by multiple nodes;

define, for each entity type, a rendering function;

determine an amount of space required by each of the plurality of entities in the relevance map at the respective node locations of the plurality of entities based upon the defined rendering function for the plurality of entities;

replace the nodes with the entities that the nodes respectively represent; and arrange the plurality of entities in the relevance map in a manner that avoids overlap by the plurality of entities with respect to each other while substantially preserving proximities of the plurality of entities to their respective anchor entities.

\* \* \* \* \*

UNITED STATES PATENT AND TRADEMARK OFFICE
CERTIFICATE OF CORRECTION

PATENT NO. : 9,152,679 B2
APPLICATION NO. : 13/755814
DATED : October 6, 2015
INVENTOR(S) : Zachi Karni et al.

It is certified that error appears in the above-identified patent and that said Letters Patent is hereby corrected as shown below:

In column 12, line 38, in Claim 1, delete "overlap" and insert -- overlay --, therefor.

In column 13, line 2, in Claim 4, delete "located" and insert -- identified --, therefor.

In column 13, line 10, in Claim 5, delete "located" and insert -- identified --, therefor.

In column 13, line 12, in Claim 5, delete "map in" and insert -- map --, therefor.

In column 13, line 26, in Claim 6, delete "each while" and insert -- each other while --, therefor.

In column 14, line 53, in Claim 11, delete "plurality" and insert -- pluralities --, therefor.

In column 14, line 66, in Claim 12, delete "user that" and insert -- user --, therefor.

Signed and Sealed this
Twenty-first Day of June, 2016

Michelle K. Lee
*Director of the United States Patent and Trademark Office*